F. E. MUNSELL.
PRUNING IMPLEMENT.
APPLICATION FILED AUG. 14, 1912.

1,098,290.

Patented May 26, 1914.

Witnesses
Frederic W. Ely.
John J. McCarthy

Inventor
Frank E. Munsell
By Victor J. Evans
Attorney

UNITED STATES PATENT OFFICE.

FRANK E. MUNSELL, OF HAMILTON, MISSOURI.

PRUNING IMPLEMENT.

1,098,290. Specification of Letters Patent. Patented May 26, 1914.

Application filed August 14, 1912. Serial No. 715,077.

*To all whom it may concern:*

Be it known that I, FRANK E. MUNSELL, a citizen of the United States of America, residing at Hamilton, in the county of Caldwell and State of Missouri, have invented new and useful Improvements in Pruning Implements, of which the following is a specification.

This invention relates to improvements in pruning implements and has particular application to implements of this character for trimming trees and the like.

In carrying out the present invention, it is my purpose to provide a pruning implement which will include a pair of jaws operable for cutting or trimming purposes and equipped with means to facilitate the cutting action.

It is also my purpose to provide a pruning implement which will embrace the desired features of simplicity, efficiency and durability coupled with cheapness of cost and manufacture and which will be constructed of few parts and these so arranged as to reduce the possibility of derangement to a minimum.

With the above and other objects in view, the invention consists in the construction, combination and arrangement of parts hereinafter set forth in and falling within the scope of the claim.

Figure 1:
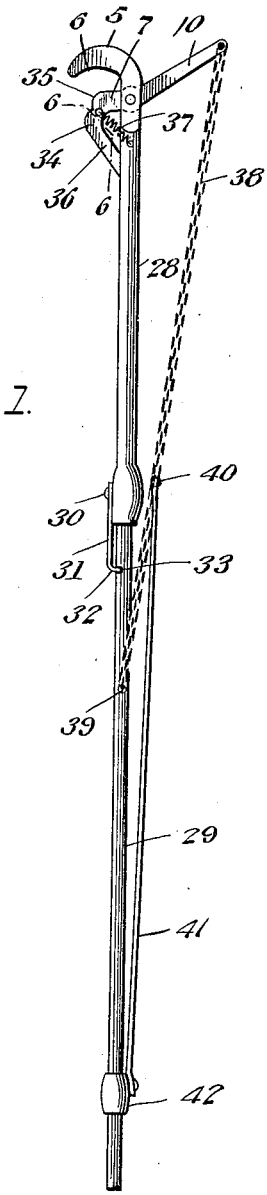
Figure 2:

In the accompanying drawing; Figure 1 is a view in side elevation of a pruning implement constructed in accordance with the present invention, the jaws being shown in open position, and Fig. 2 is a cross sectional view through one of the jaws on the line 6—6 of Fig. 1.

Referring now to the accompanying drawing in detail, the numerals 28 and 29 designate telescopic sections constituting a handle, the section 29 sliding within the section 28, the latter having fastened thereto as at 30 a spring finger 31 provided at its free end with a lug or pin 32 designed to engage an aperture 33 formed in the lower section 29 of the handle so as to hold the sections distended and in handle formation. The upper section 28 has connected thereto an outwardly curved stationary jaw 5 formed with a cutting edge or blade 6, while pivotally mounted upon one side of the section 28 in proximity to the jaw 5 and coöperating therewith is a working jaw 7 which, in the present instance, is provided with a reduced portion 34 forming the working surface of the jaw, the cutting edge of the jaw being preferably bulged, as at 35, so as to facilitate the cutting action. The forward end of the jaw 7 terminates in a downward extension or foot 36 designed to abut the adjacent portion of the section 28 of the handle and normally held in engagement with such portion of the handle by means of a tension device such, for instance, as a contractile spring 37, while the opposite end of the jaw has formed integral therewith an outwardly extending lever 10 having connected to the free terminal thereof a flexible element 38 as a chain, cord, cable or the like, the free end of the latter being fastened to the lower section 29 of the handle at a point immediately below the lower end of the section 28, as illustrated at 39. Connected to the flexible element 38 as at 40 is one extremity of a cord, cable, chain or the like 41 having its free end suitably fastened to a slide 42 encircling the lower section of the handle and slidable thereon. It will be observed that the jaws are normally held spaced apart or in open position, incident to the contractile spring 37 holding the movable jaw away from the stationary jaw.

In use, the jaws are placed in contact with the limb of a tree or the like to be cut, and should such limb be at a considerable height above the ground or the operator handling the implement, the sections of the handle are fastened together rigidly by means of the pin 32 carried by the spring finger 31 and the slide 42 moved along the section 29 toward the free end of such section so as to actuate the working jaw against the tension of the spring 37 and thereby cut the limb. On the other hand, when it is desired to cut relatively low limbs, the operator grasps the section 29 of the handle immediately below the lower extremity of the section 28 with one hand and with the other hand grips the adjacent part of the chain 38, that is the portion of such chain between the connections 39 and 40. By exerating a pull on the chain 38, the lever 40 will be swung downwardly and so move the jaw 7 into engagement with the pawl 5.

It will be seen that I have provided a pruning implement by means of which an operator within a tree may manipulate the jaws of the implement so as to cut an adjacent branch, without the necessity and inconvenience of telescoping the sections of the handle which would be necessary if the connections between the chain 38 and the lower section of the handle were in effect.

I claim:

A pruning implement comprising stationary and movable jaws, a handle or pole supporting said jaws and consisting of a number of telescopic sections, a lever on said movable jaw, a slide movable on the lower section of the handle, flexible connections between said lever and the lower section of said handle, a flexible connection between said lever and said slide, said last-named connection including a portion of the first-named connection, and means for holding the sections of said handle against relative movement and in extended position.

In testimony whereof I affix my signature in presence of two witnesses.

FRANK E. MUNSELL.

Witnesses:
SETH M. YOUNG,
EARL C. McCRARY.

Copies of this patent may be obtained for five cents each, by addressing the "Commissioner of Patents, Washington, D. C."